US006671731B1

(12) United States Patent
Cain (10) Patent No.: US 6,671,731 B1
(45) Date of Patent: Dec. 30, 2003

(54) GENERIC PROXY SERVICE FOR DOCSIS-ENABLED SET TOP DEVICES

(75) Inventor: Michael E. Cain, Arvada, CO (US)

(73) Assignee: MediaOne Group, Inc., Englewood, CO (US)

(*) Notice: Subject to any disclaimer, the term of this patent is extended or adjusted under 35 U.S.C. 154(b) by 639 days.

(21) Appl. No.: 09/597,494

(22) Filed: Jun. 21, 2000

(51) Int. Cl.[7] .............................................. G06F 15/16
(52) U.S. Cl. ...................... 709/230; 709/218; 709/219; 709/227; 709/228
(58) Field of Search ................................ 709/218, 219, 709/225, 228, 227, 230

(56) References Cited

U.S. PATENT DOCUMENTS

| | | | | |
|---|---|---|---|---|
| 5,586,260 A | * | 12/1996 | Hu ............................... | 713/201 |
| 5,805,803 A | * | 9/1998 | Birrell et al. ................ | 713/201 |
| 6,510,464 B1 | * | 1/2003 | Grantges et al. ............ | 709/225 |
| 6,516,316 B1 | * | 2/2003 | Ramasubramani et al. .... | 707/9 |
| 2001/0011284 A1 | * | 8/2001 | Humpleman et al. ........ | 707/511 |
| 2003/0005084 A1 | * | 1/2003 | Humphrey .................. | 709/218 |

OTHER PUBLICATIONS

Tom Sheldon, Encyclopedia of Networking Electronic Edition, LAN Times, 1998, pp. 395–406, Osborne/McGraw–Hill, Berkeley, California.

* cited by examiner

Primary Examiner—Saleh Najjar
(74) Attorney, Agent, or Firm—Brooks Kushman P.C.

(57) ABSTRACT

A generic proxy server, set top device, and methods of operation are described to enable communication with the set top device through the generic proxy server. The set top device is connected to the generic proxy server through a private network. A user wishing to communicate with the set top device is connected to the generic proxy server through a public network. The set top device prepares for communication by registering itself with the generic proxy server and then providing a gateway code to the generic proxy server. The user initiates communications by contacting the generic proxy server and identifying a particular set top device to be accessed. Communications between the user and a set top device through the generic proxy server are enabled by the generic proxy server executing the gateway code supplied by the set top device.

18 Claims, 6 Drawing Sheets

GENERIC PROXY SERVICE FOR DOCSIS-ENABLED SET TOP DEVICES

TECHNICAL FIELD

The present invention is related to the fields of proxy servers for use with digital networks, and Set Top Devices for use with cable networks.

BACKGROUND ART

Functionality of Set Top Devices (STD) has expanded in recent years from that of simple cable boxes to fully interactive devices that can communicate with the cable service provider, commonly known as a Multiple System Operator (MSO). Modern STDs can communicate with the MSO's provisioning servers across a video cable network using the Transmission Control Protocol/Internet Protocol (TCP/IP). This capability allows the MSO to control functionality of the STDs from the MSO's central office. Using TCP/IP, the MSO can remotely program the STDs to allow or deny access to pay-per-view channels, premium channels and the like by sending digital commands across the video cable network. This approach is far more efficient than sending technicians to individual homes to change the hardware or firmware of the STD. STD based digital communication also allows the home user to interact with the MSO to request information and services. For example, the home user may request and receive a listing of the television programming for the next three days, or the listing of movies showing the local theaters.

As the functionality of the STDs expand, they will take on new tasks such as the ability to record television programs. STDs could be made more desirable if this expanded functionality could be controlled remotely by the home user. The idea here is that the home user could program the STD to record a television program while the home user is at work, school, a library, or any other place where Internet access is available. It would no longer be necessary for the home user actually to go to the home to program the STD to record the program.

Establishing communications between a computer and the STD when both are located on the same network is a straightforward task. Here, issues of security and expandability need to be considered. Security deals with an unauthorized access to the STD. Home users do not want their STDs remotely programmed by their neighbors. Expandability concerns increased functionality of the next generation of STDs brought to market. The situation gets more complicated when the user's computer is located on a public network such as the Internet, and the STD is located on the MSO's private network. In this situation, accessability of the STD by the computer must be addressed. Typically, the STD is assigned a private, non-routable Internet Protocol (IP) address that cannot be reached from the Internet. Furthermore, the STDs IP address may change from time to time as the MSO reallocates IP addresses on the private network.

The task of communicating between a private network and a public network is commonly allocated to a proxy server that links to both the private network and to the public network simultaneously. Typically, the proxy server runs an application-level gateway code that allows messages to pass between the two networks. Application messages accepted by the gateway code are usually for well-defined protocols such as the File Transfer Protocol or the Hypertext Transfer Protocol.

At first glance, it would appear that this approach would work for STDs that conform to the Data Over Cable Service Interface Specification (DOCSIS) developed and maintained by Cable Television Laboratories, Incorporated of Louisville, Colo. An application-level gateway code could be written and executed on the proxy server to enable a computer on the public network side to communicate with DOCSIS-enabled STDs on the private network side. Allowing DOCSIS-compliant messages through the proxy server, however, is not a sufficient solution. Security and expandability issues must be accounted for in the application-level gateway code. Furthermore, as the next generations of STDs become available and are connected to the MSO's private network, the application-level gateway code must be continually upgraded to account for the new services and features available on the new STDs. This places a tremendous burden on an MSO to keep the application-level gateway code compatible with every feature and service supported by all of the different STDs that may be connected to the private network.

DISCLOSURE OF INVENTION

The present invention is a generic proxy server, a network-connected machine such as a Set Top Device (STD), and methods of operation to enable communications with the machine through the generic proxy server. In operation, the machine (hereinafter called the STD) first registers itself with the generic proxy server and then transfers a gateway code to the generic proxy server via a first network. The generic proxy server then executes the gateway code to enable communications with the STD from a second network. One advantage of this approach over traditional proxy servers is that the generic proxy server is insensitive to the gateway code that may vary from manufacturer to manufacturer, and from generation to generation of STDs.

An authenticating function may be provided to limit access to the STD from the second network. Authentication may be performed by the generic proxy server or by the STD to insure proper identification of a user on the second network. Furthermore, the proxy server may further restrict communications between the user and the STD based upon STD services authorized to the user.

Accordingly, it is an object of the present invention to provide a generic proxy server and method of operation to execute a gateway code received from first machine on a first network to enable communications through the generic proxy server between the first machine and a second machine on a second network.

Another object of the present invention is to provide for a network-connected machine (i.e. STD) and method of operation to supply the gateway code to the generic proxy server to have executed on its behalf.

These and other objects, features, and advantages will be readily apparent upon consideration of the following detailed description in conjunction with the accompanying drawings.

BEST MODE FOR CARRYING OUT THE INVENTION

Figure 1:
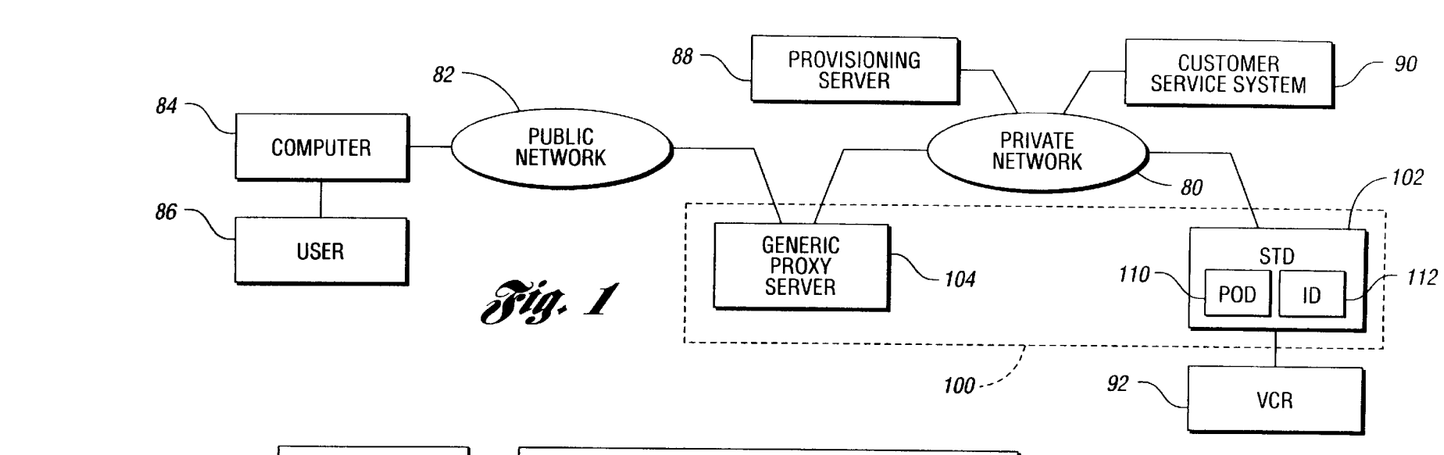
FIG. 1 is a block diagram of a hardware system that implements the present invention.
Figure 2:
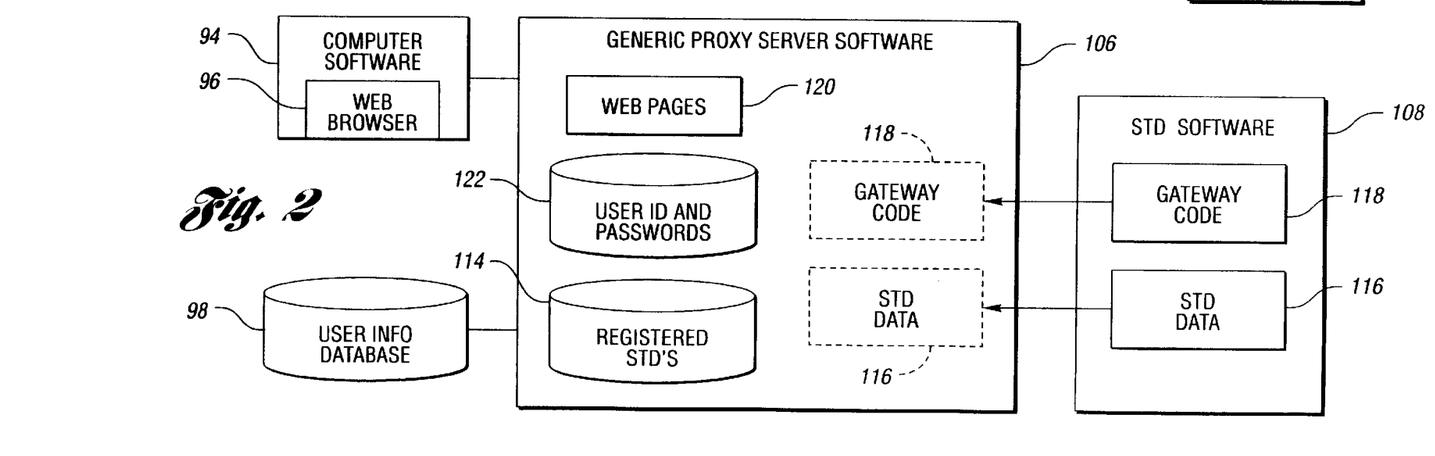
FIG. 2 is a block diagram of a software system that implements the present invention.

FIG. 1 and FIG. 2 are hardware and software block diagrams respectively of an example system 100 that implements the present invention. A first machine, such as a Set Top Device (STD) 102 shown in FIG. 1, is connected to a private network 80 operated by a Multiple System Operator (MSO) (not shown). The private network 80 is connected through a generic proxy server 104 to a public network 82 such as the Internet. A second machine, such as a computer 84, is connected to the public network 82. The computer 84 may be used by a user 86 to communicate with the STD 102 through the generic proxy server 104. The private network 80 may include a provisioning server 88 to supply a network address and boot strap files to the STD 102 as necessary. A customer service system 90 may also be included on the private network 80 to provide additional information about the users 86, their STDs 102, and services authorized to the users 86.

Referring to FIG. 2, the user 86 communicates with the STD 102 using computer software 94 executed on the computer 84. The computer software 94 typically, although not necessarily, includes a web browser 96 that is used for communicating on the public network 82. In particular, the web browser 96 may be used to communicate with generic proxy server software 106 and the STD 102. The generic proxy server software 106 enables communications through the generic proxy server 104. Communications between the computer software 94 and the STD 102 may include communications with Set Top Device software 108 executed by the STD 102. It should be understood that any functionality attributed to the STD 102 in this document may be due to the STD 102 hardware alone, or a combination of the hardware and STD software 108 executing on the hardware.

The STD 102 must have unique a private network address in order to communicate on the private network 80. This may be accomplished by obtaining the private network address from the provisioning server 88, as shown in block 300 in FIG. 3. In the preferred embodiment, the MSO uses a Dynamic Host Configuration Protocol (DHCP) type provisioning server 88 to provide the private network addresses to the STD 102. The DHCP is defined by the Internet Architecture Board (IAB) in a draft standard protocol Request For Comment (RFC) 2132. In an alternative embodiment, a Bootstrap Protocol (BOOTP) type provisioning server 88 may be used to provide the private network addresses to the STD 102. The BOOTP is defined by the IAB in draft standard protocol RFC 2131. In other embodiments, the private network address may be embedded within the STD 102 itself, in a Point Of Deployment (POD) module 110 supplied by the MSO to the user 86 for insertion into the STD 102, manually programmed into the STD 102 by the user 86, or the like.

Figure 3:
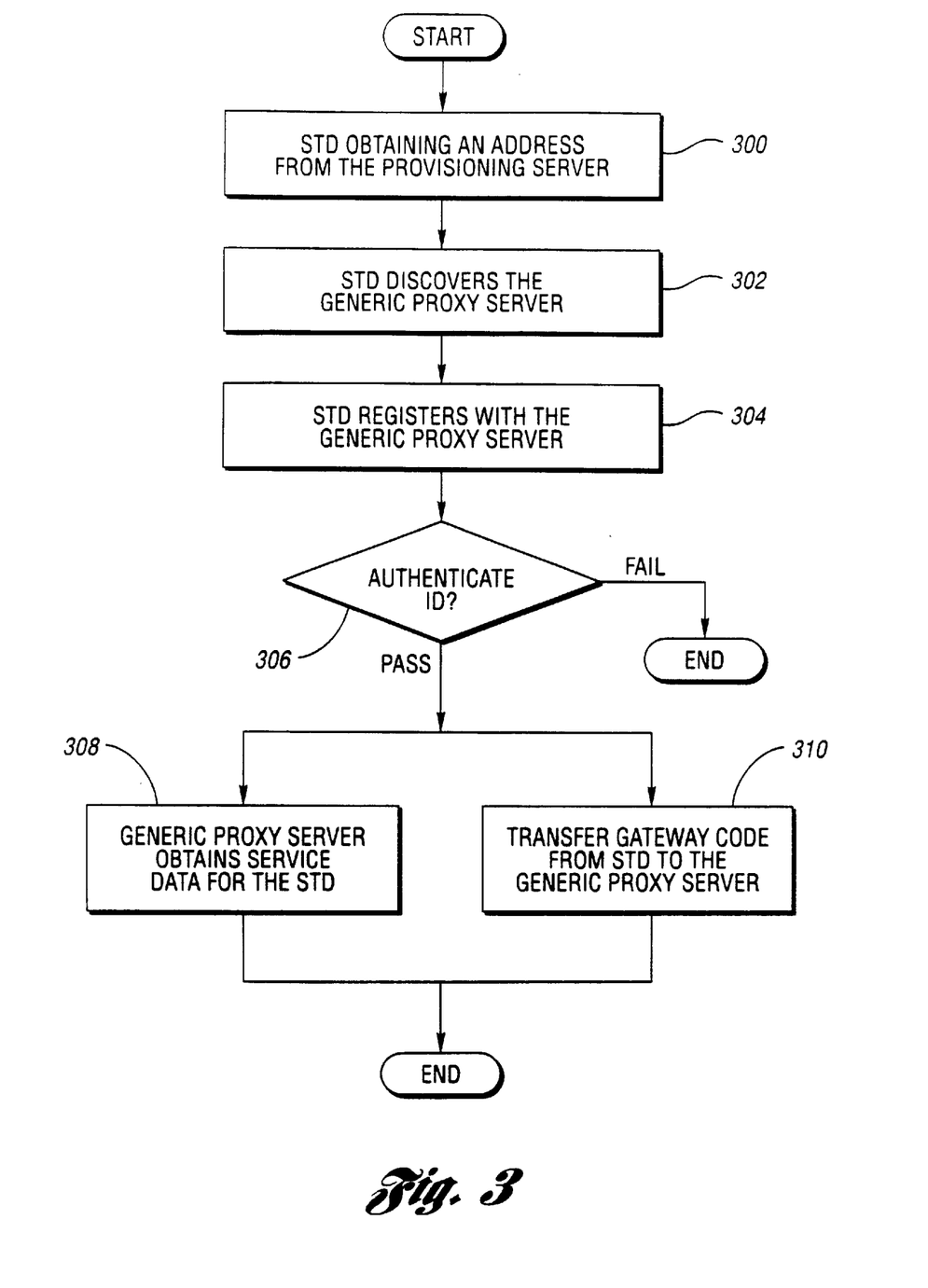
FIG. 3 is a flow diagram of a method for registering a set top device with the generic proxy server.

Continuing with FIG. 3, the next task of the STD 102 is to discover the private network address of the generic proxy server 104, as shown in block 302. This may be accomplished in any one of several ways. For example, the STD 102 may broadcast a message asking the generic proxy server 104 to identify itself and its private network address. In an alternative embodiment, the generic proxy server 104 may be assigned a standardized private network address already known to the STD 102. In yet another alternative embodiment, the generic proxy server's private network address may be supplied to the STD 102 by the provisioning server 88 while allocating the STD's private network address or boot files.

Once the STD 102 has discovered the private network address of the generic proxy server 104, then the STD 102 will register itself with the generic proxy server 104, as shown in block 304. In the preferred embodiment, this is accomplished by transferring a standard identification number (ID) 112 unique to each STD 102 to generic proxy server 104 as shown in FIG. 1.

The generic proxy server 104 authenticates the STD's standard identification number 112, as shown in decision block 306. Authentication is based upon a registered STD database 114 included in the generic proxy server software 106. In an alternative embodiment, the registered STD database may be included in a user information database 98 maintained in the customer service system 90, and copied to the generic proxy server 104 as necessary. If the standard identification number 112 fails authentication, as shown by the FAIL branch in decision block 306, then the generic proxy server 104 does not register the STD 102. This handles situations where an unauthorized STD 102 has become connected to the private network 80 and attempts to establish communications to the public network 82 through the generic proxy server 104.

In a case where the standard identification number 112 passes authentication, as shown by the PASS branch of decision block 306, then the generic proxy server 104 obtains allowable service information associated with the STD 102, shown in block 308. In the preferred embodiment, the generic proxy server 104 obtains the allowable service information from the user information database 98. This approach allows the MSO to control and change the services the user 86 is allowed to access through the generic proxy server 104 without having to make any changes to the generic proxy server 104, the STD 102, the generic proxy server software 106, or the STD software 108. In an alternative embodiment, the generic proxy server 104 obtains the allowable service information from the STD 102. In this embodiment, the service data is stored as part of a STD data 116 included within the STD software 108. This approach allows the MSO to control services by embedding service data in the POD module 110 and then having the STD 102 transfer the embedded service data to the generic proxy server 104.

Another consequence of the standard identification number 112 passing authentication is that the STD 102 will transfer a gateway code 118 to the generic proxy server 104, as shown in block 310. The generic proxy server 104 will execute the gateway code 118 on behalf of the STD 102 to enable the STD 102 be communicate with the computer 84 through the generic proxy server 104. Communications between the gateway code 118 and the computer 84 may be direct or indirect through the generic proxy server software 106. Likewise, communications between the gateway code 118 and the STD software 108 may be direct or indirect through the generic proxy server software 106.

In the preferred embodiment, the gateway code 118 is a platform independent interpretive language such as Java, although other standards may be used in the present invention. Java is defined by Sun Microsystems, Incorporated of Palo Alto, Calif. The Java standard has some significant advantages for this type of situation in that it is possible to restrict what the Java code can do on the generic proxy server 104. For example, it is possible to guarantee that the Java code will not be allowed to write intermediate results onto the local hard disk (not shown) of the generic proxy server 104. In general, Java provides useful security considerations for the generic proxy server 104 and has sufficiently fine-grained control to prevent the gateway code 118 from reaching underlying resources of the generic proxy server 104 that may cause the server to crash.

The gateway code 118 executing on the generic proxy server 104 enables communication between the STD 102 and the computer 84 on the public network 82 through the generic proxy server 104. One advantage of this approach is that the generic proxy server 104 need not understand the protocols implemented by the gateway code 118. This frees the MSO from updating the generic proxy server software 106 each time there is a change in the protocol or services supported by the existing STDs 102. Furthermore, as newer STDs 102 are added to the private network 80, the generic proxy server software 106 may remain unchanged as the new STDs 102 will provide updated gateway code 118 for execution. Each STD 102 connected to the private network 80 may provide a unique gateway code 118 to the generic proxy server 104 for execution.

Another advantage of using a standard interpretative code such as Java is that it allows the MSO to use a wide variety of hardware and operating systems to implement the generic proxy server 104 and the generic proxy server software 106. The MSO may take advantage of improvements in hardware and software for the generic proxy server 104 and generic proxy server software 106 without requiring a redesign of the gateway code 118. Platform independence of the gateway code 118 also allows the user 86 to keep their existing STDs 102 when they subscribe to a new MSO with different generic proxy servers 104 and generic proxy server software 106.

Figure 4:
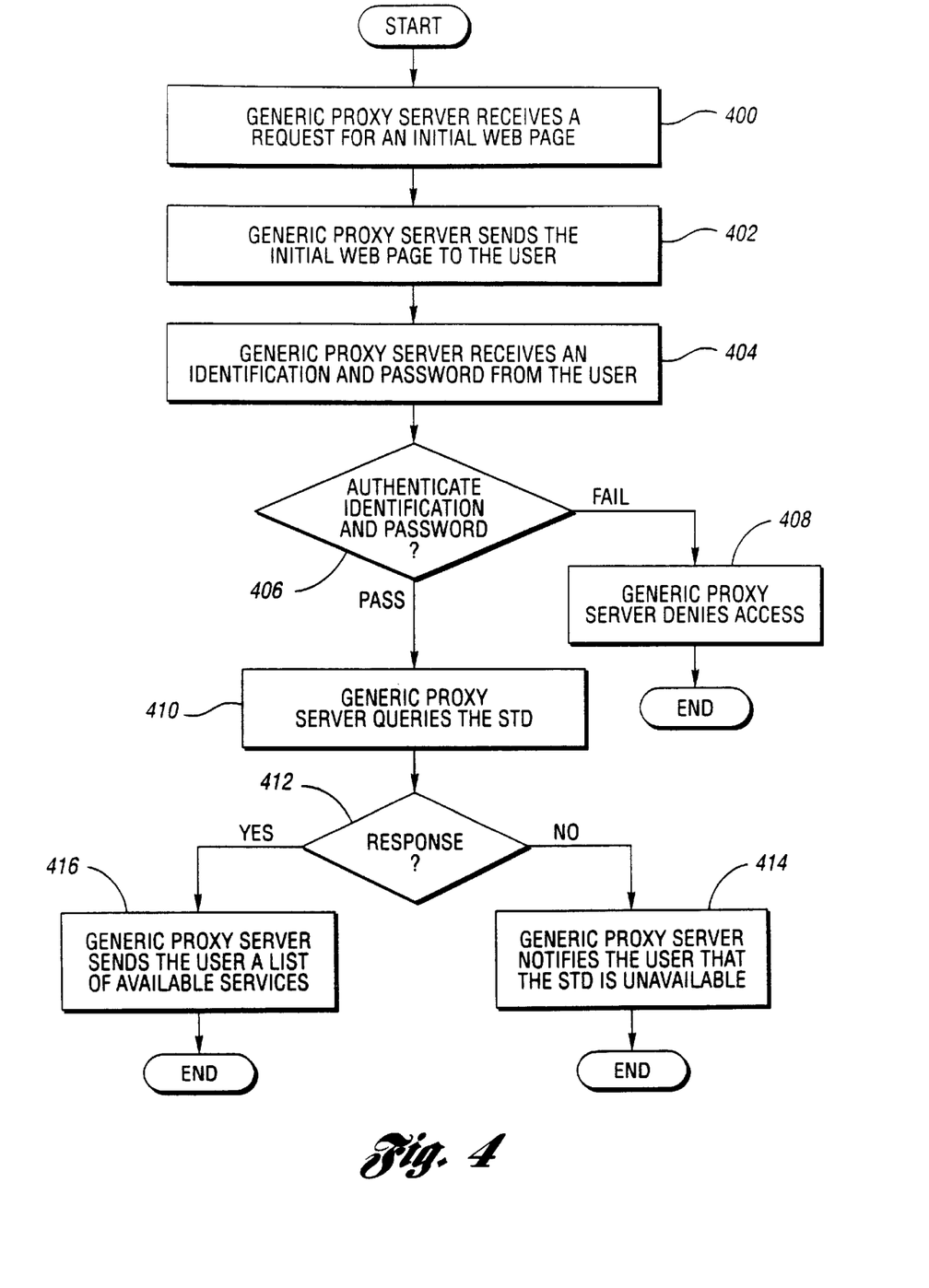
FIG. 4 is a flow diagram of a method for authenticating a user at the generic proxy server.

Referring to FIG. 4, a user 86 working from computer 84 on the public network 82 must first contact the generic proxy server software 106 before reaching the STD 102 on the private network 80. Generic proxy server software 106 first becomes aware of the user 86 when it receives a request for an initial web page from the user's web browser 96, as shown in block 400. Generic proxy server software 106 responds to this request by sending an initial web page to the user's web browser, as shown in block 402. The initial web page is stored in a collection of web pages 120. In one embodiment, the generic proxy server 104 is the primary storage site for the web pages 120. In alternative embodiments, web pages 120 may have primary storage in the user information database 98, the STD software 108, or other storage location. Web pages 120 are then copied to the generic proxy server 104 when the generic proxy server 104 is ready.

It should be noted that the present invention supports use of other forms of information transfers to and from the computer 84. Web pages in accordance with the Hypertext Markup Language standard (HTML)(IAB proposed standard protocol RFC 1866) is only one embodiment of many possible embodiments. Other protocols such as JAVA applets, ActiveX components (Microsoft Corporation, Redmond, Wash.), Flash 4 scripts (Macromedia, San Francisco, Calif.) and any other component objects that a browser can render may be used to transfer information between the computer 84 and the generic proxy server 1104, and between the computer 84 and the STD 102.

The initial web page includes an entry for the user 86 to provide an identification. Identification may be a name, street address, an account number, or any other form of information that the MSO requires the user 86 to use for identification purposes. Commonly, although not necessarily, the initial web page may also include a password entry. The password provides a level of security to prevent unauthorized access to the STDs 102 through the generic proxy server 104. Once the user 86 has entered the identification and password, then this information is returned to the generic proxy server software 106, as shown in block 404.

The user's identification and password are then authenticated, as shown in decision block 406. Authentication may be performed by the generic proxy server software 106 alone or with support of the gateway code 118 associated with the user's identification. For simplicity in understanding, the remainder of this function will be described using only the generic proxy server software 106. If either the identification, password, or both fail authentication, as shown by the FAIL branch of decision block 406, then access to the private network 80 is denied, as shown in block 408. If both the identification and the password pass authentication, as shown by the PASS branch of decision block 406, then access to the private network 80 is allowed. Information necessary to authenticate the identification and the password is stored in a user identification and password database 122. In one embodiment, the user identification and password database 122 has primary storage in the generic proxy server 104. In alternative embodiments, this information may have primary storage in the customer service system 90, the provisioning server 88, or any other storage device on the public or private network 80. Here, updates to the user identification and password database 122 are copied to the generic proxy server 104 periodically or immediately after the update takes place.

Having successfully authenticated the user 86, the generic proxy server software 106 then needs to determine if the STD 102 associated with that user 86 is available on the private network 80. The generic proxy server software 106, (or the gateway code 118) accomplishes this by sending an inquiry message to the STD 102 as shown in block 412. In the preferred embodiment, the inquiry message is used to determine if the STD software 108 is executing and reachable via the private network 80. In alternative embodiments, the inquiry message may be used to determine if the hardware of the STD 102 is operational and reachable via the private network 80. If the generic proxy server software 106 fails to receive a m response to the inquiry message, as shown by the NO branch of decision block 410, then the STD 102 is determined to be unavailable. Here, the generic proxy server software 106 notifies the user 86 that the STD 102 is unavailable, as shown by block 414. If the generic proxy server software 106 receives a response within a predetermined time limit, as shown by the YES branch of decision block 412, then the generic proxy server software 106 concludes that the STD 102 is available and communicating. In this case, the generic proxy server software 106 then sends the user 86 a list of available services for that STD 102, as shown in block 416.

The list of available services may be created dynamically using available service information defined in the user information database 98. In alternative embodiments, available service information or a unique list of services for the STD 102 may be stored in the STD 102 as part of the STD data 116, the gateway code 118, or any other portion of the STD software 108. During or after STD 102 registration with the generic proxy server 104, the available service information or unique list of services are transferred to the generic proxy server 104.

Each list of available services provided to the user 86 may be a complete list of all services that the STD 102 is capable of performing, or a partial list of services. By providing the list of available services to the user 86, instead of requiring the user 86 to enter instructions for the STD 102 manually, the MSO can restrict communications to the STD 102 from the public network. This may be useful in situations where the STD 102 has capabilities for which the MSO wants to charge a premium fee. For example, the user 86 may want to record a program broadcast by the MSO on a pay-per-view basis. If the user 86 has not agreed to pay the premium fee to the MSO to view the program then the list of available services provided to the user 86 by the generic proxy server software 106 will not include an option to record the pay-per-view event. Although the user's STD 102 is capable of recording the pay-per-view event, the user 86 cannot remotely program the STD 102 to do so.

Figure 5:
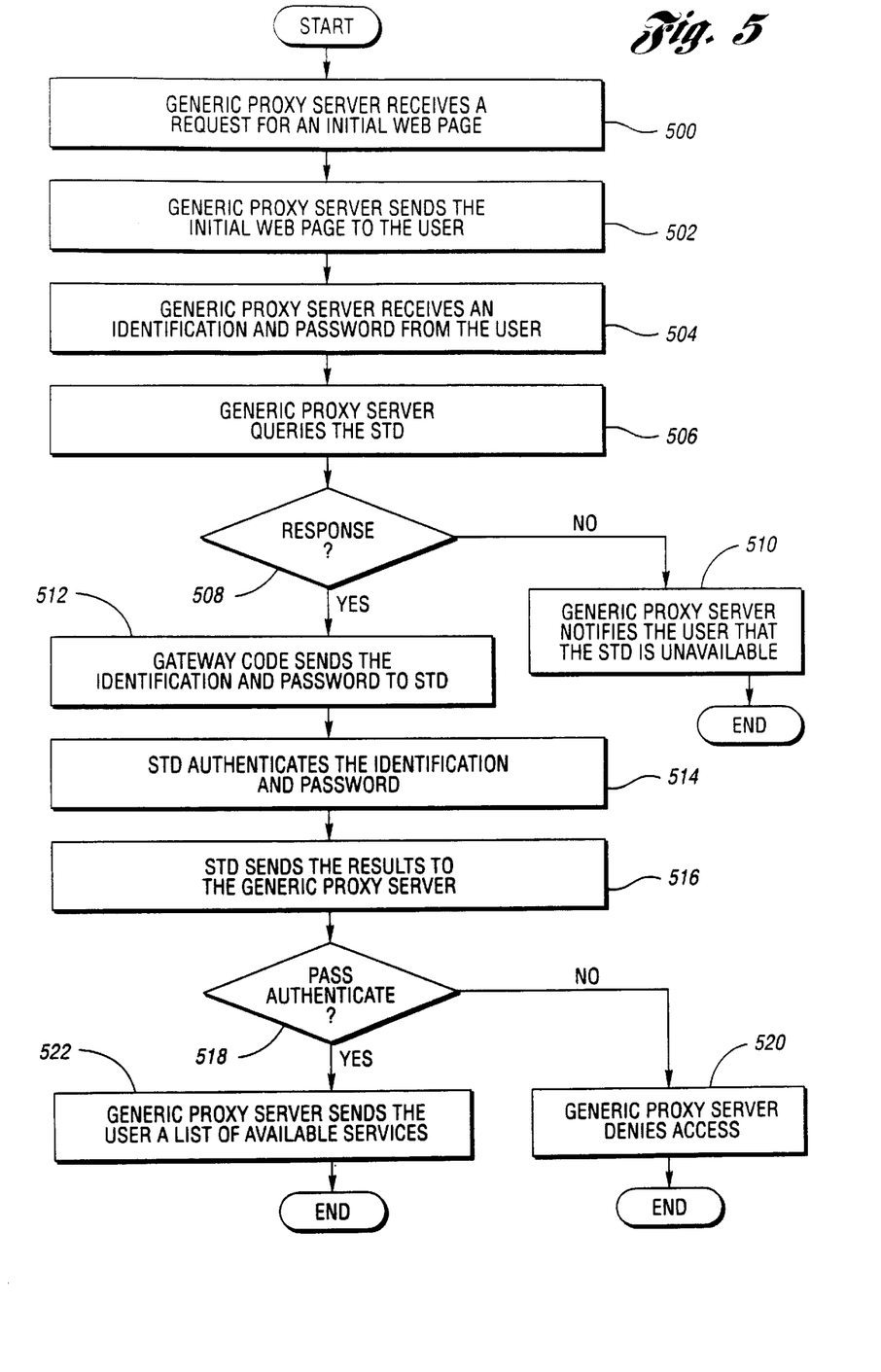
FIG. 5 is a flow diagram of a method of authenticating a user at the set top device.

In an alternative embodiment, authentication of the user 86 may be a performed by the STD 102 itself. Referring to FIG. 5, authentication starts as before when the generic proxy server software 106 receives a request from user 86 for an initial web page, as shown in block 500. The generic proxy server software 106 then sends the initial web page to the user 86, as shown in block 502. The user 86 enters the identification and password, and returns the information to the generic proxy server software 106.

Upon receipt of the user's identification information, as shown by block 504, the generic proxy server software 106 and/or the gateway code 118 then determines if the STD 102 associated with that user 86 is available. For simplicity of understanding, the remainder of this function will be described in terms of the generic proxy server software 106 only. The generic proxy server software 106 determines STD 102 availability by sending an inquiry message to the STD 102, as shown in block 506. If the STD 102 does not provide a response to the inquiry message, as shown by the NO branch of decision block 508, then the generic proxy server software 106 concludes that the STD 102 is not available. Here, the generic proxy server software 106 sends a message to the user 86 indicating that the STD 102 is unavailable, as shown in block 510. If the STD 102 does respond within the predetermined time, as shown by the YES branch of decision block 510, then the generic proxy server software 106 concludes that the STD 102 is available and communicating. If it has not done so already, the generic proxy server 104 beings executing the gateway code 118 for the STD 102. Next, the gateway code 118 converts the identification and password information into a protocol understood by the STD 102 and sends the identification and password to the STD 102, as shown in block 512. The STD 102 then authenticates the user's identification and password, as shown in block 514.

STD 102 notifies the gateway code 118 of the authentication results as shown in block 516. If authentication has failed, as shown by the NO branch of decision block 518, then the generic proxy server software 106 notifies the user 86 accordingly as shown in block 520. If authentication has passed, as indicated by the YES branch of decision block 518, then the generic proxy server software 106 provides the user 86 with a list of available services associated with the STD 102, as shown in block 522.

In the preferred embodiment, the list of available services available for the STD 102 and the access denial messages are under the control of the MSO. This allows the MSO to present a unified set of web pages 120 on the public network 82 regardless of the manufacturer of the STDs 102 coupled to the private network 80. Static type web pages 120, such as the STD unavailable and access denied web pages, may be generated by the MSO and copied to the generic proxy server 104. The list of available services web page will be a dynamic type web page populated with the services available for the particular STD 102 being accessed.

In alternative embodiments, responsibility for storing some of the web pages may be allocated to the STD 102. For example, where a STD 102 performs identification and password authentication, then the STD 102 may generate the access denied web page. In another example, the STD 102 may have the list of available services available web page embedded within the STD 102. Here, the STD 102 provides the web pages to the gateway code 118 that relays them to the user 86 directly or indirectly through the generic proxy server software 106. Communications with the STD 102 from the public network 82 may be restricted by the STD 102 by storing the list of available services in the POD module 110. The STD-unavailable web page must always be the responsibility of the generic proxy server 104 since the STD 102 is unavailable by definition.

Figure 6:
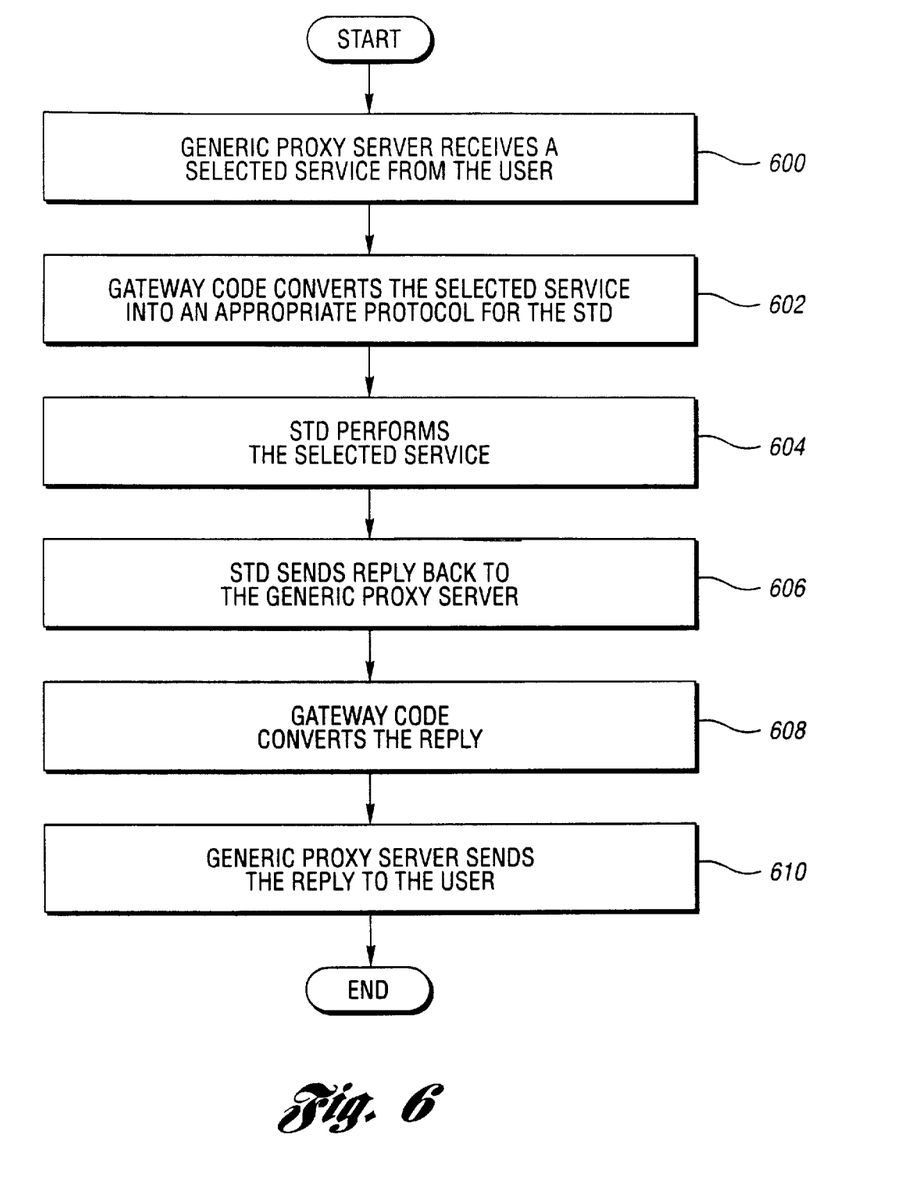
FIG. 6 is a flow diagram of a method of communicating selected services between the user and the set top device.

User 86 may select a particular service he wishes to have the STD 102 perform from the list of available services. For example, the list of available services may include recording a television program from a selected channel on a selected date at a selected time. Other examples include setting alarms, switching on and switching off power to an auxiliary 115 Vac outlet, and programming a third in machine, such as the video cassette recorder 92 through an infrared link. Referring to FIG. 6, the generic proxy server software 106 receives the user's selection from the list of available services, as shown in block 600. Upon receipt of this selection, the gateway code 118 converts the information to an appropriate protocol understood by the STD 102, as shown in block 602. Next, the STD 102 performs the selected service requested by the user 86, as shown in block 604.

Upon completion of the service, the STD 102 generates a reply that is sent back to the generic proxy server software 106, as shown in block 606. The gateway code 118 interprets the reply into a format suitable for placement on a reply web page, as shown in block 608. The reply web page is then provided to the user 86, as shown in block 610. The above steps may be repeated over and over, as desired by the user 86.

Figure 7:
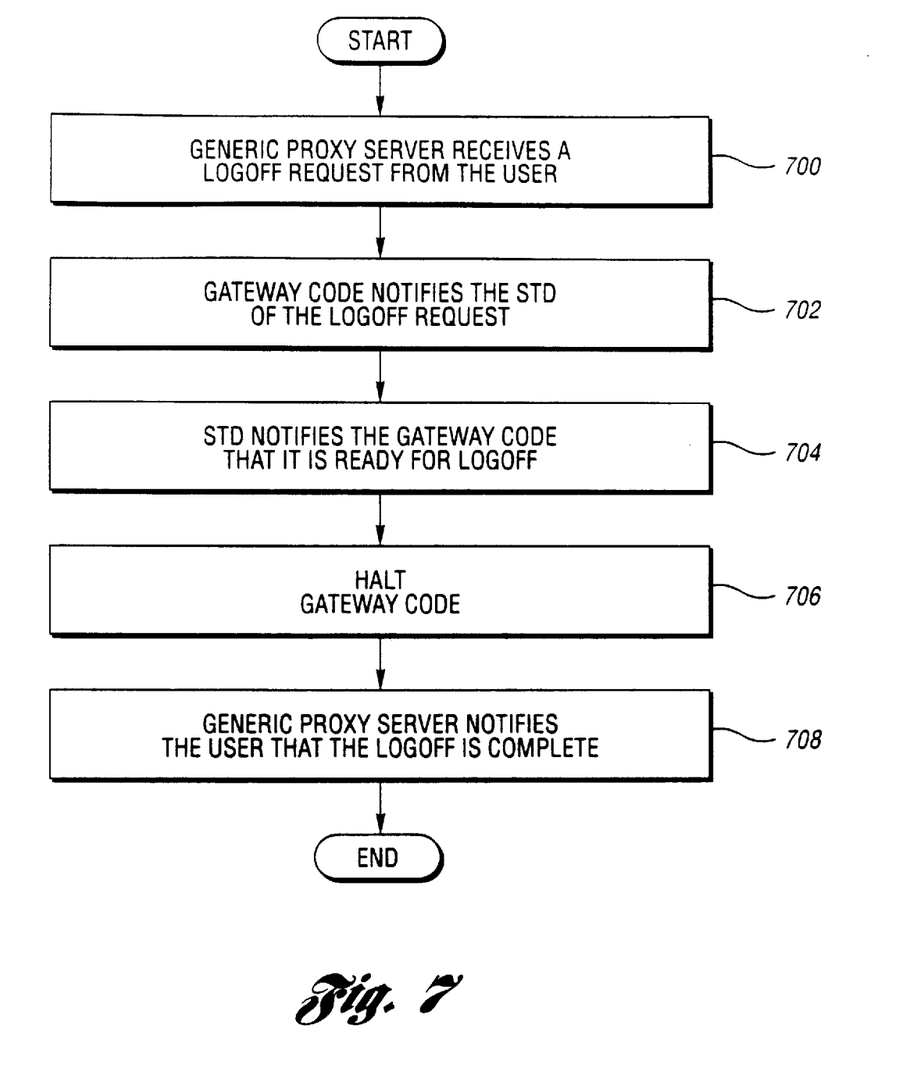
FIG. 7 is a flow diagram of a method for logging off the user.

Referring to FIG. 7, the generic proxy server software 106 becomes aware that the user 86 has finished selecting services, when it receives a logoff request from the user 86, as shown in block 700. Gateway code 118 responds to the logoff request by notifying the STD 102 of the logoff, as shown in block 702. The STD 102 is then given time to perform any housekeeping functions necessary, after which it notifies the gateway code 118 that it is ready for the logoff, as shown in block 704. At this point, the generic proxy server 104 may halt execution of the gateway code 118 for the STD 102 to block any further access to the STD 102 from the public network 82, as shown in block 706. In an alternative embodiment, the gateway code 118 for the STD 102 may be allowed to continue executing on the generic proxy server 104 though the user 86 has logged off. Finally, as shown in block 708, the generic proxy server software 106 informs the user 86 that a logoff has completed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of operating a system having a set top device and a generic proxy server connected together through a private network, wherein the generic proxy server is connected to a machine through a public network, the method comprising:

registering the set top device with the generic proxy server;

transferring over the private network a gateway code from the set top device to the generic proxy server in response to registering the set top device, the gateway code implementing communication protocols associated with a service provided by the set top device upon execution by the generic proxy server, the implemented communication protocols enabling communications between the set top device and the machine via the public network, the generic proxy server, and the private network for the service provided by the set top device; and transferring over the public network a request from the machine to the generic proxy server requesting the generic proxy server to provide the machine with access to the set top device to enable communications between the machine and the set top device for the service provided by the set top device; and executing the gateway code by the generic proxy server in response to the request from the machine, the gateway code enabling communications between the set top device and the machine through the public network, the generic proxy server, and the private network for the service provided by the set top device upon execution by the generic proxy server.

2. The method of claim 1 wherein:

transferring a request from the machine to the generic proxy server includes transferring an identification of the machine from the machine to the generic proxy server, the method further comprising authenticating an identification received from the machine to protect access to the set top device from the public network.

3. The method of claim 2 further comprising restricting communications from the machine to the set top device in response to the identification received from the machine.

4. The method of claim 1 wherein a second machine is in communications with the set top device for enabling the service provided by the set top device, the method further comprising:

receiving a message at the set top device from the machine, the message being indicative of a control setting for the service provided by the set top device; and controlling the second machine from the set top device in accordance with the message in order to enable the control setting for the service provided by the set top device.

5. A method of operating a set top device to communicate with a machine, wherein the set top device and the machine are connected to private and public networks respectively and the private and public networks are joined through a generic proxy server, the method comprising:

sending a registration to the generic proxy server to register the set top device with the generic proxy server;

sending a gateway code from the set top device to the generic proxy server in response to registering the set top device, the gateway code being operative to enable communications between the set top device and the machine through the generic proxy server while being executed by the generic proxy server; and receiving a message at the set top device from the machine through the generic proxy server, the message being related to a service provided by the set top device; and controlling the service provided by the set top device in accordance with the message.

6. The method of claim 5 wherein:

receiving a message at the set top device from the machine through the generic proxy server further includes receiving an identification of the machine at the set top device from the machine through the generic proxy server, the method further comprising authenticating an identification received from the machine to protect access to the set top device from the public network.

7. The method of claim 6 further comprising restricting communications from the machine to the set top device in response to the identification received from the machine.

8. The method of claim 5 wherein a second machine is in communications with the set top device for enabling the service provided by the set top device, the method further comprising receiving a message at the set top device from the machine, the message being indicative of a control setting for the service provided by the set top device, the method further comprising controlling the second machine from the set top device in accordance with the message received from the machine in order to enable the control the service provided by the set top device.

9. An information recording medium for use in a set top device to enable communications with a communications device, wherein the set top device and the communications device are connected to private and public networks respectively and the private and public networks are joined through a generic proxy server, the information recording medium recording a computer program that is readable and executable by the set top device, the computer program comprising instructions for:

sending a registration to the generic proxy server to register the set top device with the generic proxy server;

sending a gateway code from the set top device to the generic proxy server in response to registering the set top device, the gateway code being operative to enable communications between the set top device and the communications device through the private network, the generic proxy server, and the public network while being executed by the generic proxy server;

receiving a message at the set top device from the communications device through the generic proxy server, the message being related to a service performed by the set top device: and controlling the service provided by the set top device in accordance with the message.

10. The information recording medium of claim 9 wherein the instructions for receiving a message at the set top device from the communications device through the generic proxy server further includes instructions for receiving an identification of the communications device at the set top device from the communications device through the generic proxy server, the computer program further comprises instructions for authenticating an identification received from the communications device to protect access to the set top device from the public network.

11. The information recording medium of claim 10 wherein the computer program further comprises instructions for restricting communications from the communications device to the set top device in response to the identification received from the communications device.

12. The information recording medium of claim 9 wherein a machine is in communications with the set top device for enabling the service provided by the set top device, and the computer program further comprises instructions controlling the machine from the set top device in response to the message received from the communications device.

13. The information recording medium of claim 9 wherein the information recording medium is a non-volatile memory disposed within the set top device.

14. The information recording medium of claim 9 wherein the information recording medium is disposed within a point of deployment module insertable into the set top device.

15. A method of operating a generic proxy server to establish communications between a set top device and a communications device, wherein the set top device and the communications device are connected to a private and a public network respectively and the private and public networks are joined through the generic proxy server, the method comprising:

receiving a registration from set top device with the generic proxy server;

receiving a gateway code from the set top device with the generic proxy server in response to receiving the registration from the set top device, the gateway code implementing communication protocols associated with a service provided by the set top device upon execution by the generic proxy server, the implemented communication protocols enabling communications between the set top device and the communications device via the public network, the generic proxy server, and the private network for the service provided by the set top device;

receiving a request from the communications device with the generic proxy server requesting the generic proxy server to provide the communications device with access to the set top device to enable communications between the communications device and the set top device for the service provided by the set top device: and executing the gateway code by the generic proxy server in response to receiving the gateway code, the gateway code being operative to enable enabling communications between the set top device and the communications device through the public network, the generic proxy server, and the private network for the service provided by the set top device upon execution by the generic proxy server.

16. The method of claim 15 wherein:

receiving a request from the communications device with the generic proxy server includes receiving an identification of the communications device from the communications device with the generic proxy server, the method further comprising authenticating an identification received from the communications device to protect access to the set top device from the public network.

17. The method of claim 16 further comprising restricting communications from the communications device to the set top device in response to the identification received from the communications device.

18. An information recording medium for use in a generic proxy server to enable communications between a set top device and a communications device, wherein the set top device and the communications device are connected to a private and a public network respectively and the private and public networks are joined through the generic proxy server, the information recording medium recording a computer program that is readable and executable by the generic proxy server, the computer program comprising instructions for:

receiving a registration from the set top device with the generic proxy server;

receiving a gateway code from the set top device with the generic proxy server in response to receiving the registration from the set top device, the gateway code implementing communication protocols associated with a service provided by the set top device upon execution by the generic proxy server, the implemented communication protocols enabling communications between the set top device and the communications device via the public network, the generic proxy server, and the private network for the service provided by the set top device;

receiving a request from the communications device with the generic proxy server requesting the generic proxy server to provide the communications device with access to the set top device to enable communications between the communications device and the set top device for the service provided by the set top device; and executing the gateway code by the generic proxy server in response to receiving the gateway code, the gateway code being operative to enable communications between the set top device and the communications device via the generic proxy server upon execution by the generic proxy server.

* * * * *